United States Patent
Chapman et al.

(10) Patent No.: US 7,043,632 B2
(45) Date of Patent: May 9, 2006

(54) END-TO-END SECURITY IN DATA NETWORKS

(75) Inventors: Diana M. Chapman, Kanata (CA); Abulkadev Barbir, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 855 days.

(21) Appl. No.: 10/012,340

(22) Filed: Dec. 12, 2001

(65) Prior Publication Data

US 2003/0110259 A1    Jun. 12, 2003

(51) Int. Cl.
*H04L 9/00* (2006.01)
*G06F 9/46* (2006.01)

(52) U.S. Cl. .................. 713/153; 713/151; 713/171; 718/105

(58) Field of Classification Search ............... 713/151, 713/153, 171, 152; 718/105; 709/229, 228, 709/227, 237
See application file for complete search history.

(56) References Cited

U.S. PATENT DOCUMENTS

| | | | | |
|---|---|---|---|---|
| 5,455,953 A | * | 10/1995 | Russell | 710/266 |
| 6,553,393 B1 | * | 4/2003 | Eilbott et al. | 715/513 |
| 6,681,327 B1 | * | 1/2004 | Jardin | 713/153 |
| 6,718,388 B1 | * | 4/2004 | Yarborough et al. | 709/227 |

\* cited by examiner

*Primary Examiner*—Gilberto Barrón, Jr.
*Assistant Examiner*—Kristin Derwich

(57) ABSTRACT

A method and apparatus for managing a data transmission in a network is provided, which has a client, a real server and a load-balancing node (virtual server). The load-balancing node includes a handshake executor for handling a security protocol to establish a handshake between a client and a server, and a communication executor for establishing a direct communication between the client and the server using a session information in respect to the established handshake. The handshake executor establishes the handshake with the client. When the handshake is established, the communication executor exports session information in respect to the established handshake. The client establishes TCP/IP connection with the server. The client and server communicate each other directly.

16 Claims, 3 Drawing Sheets

END-TO-END SECURITY IN DATA NETWORKS

FIELD OF THE INVENTION

The present invention relates to end-to-end security in data networks and is particularly concerned with methods for off-loading CPU-intensive operations from an end point in a data connection.

BACKGROUND OF THE INVENTION

There are several known security protocols for use in data networks. For example Secure Sockets Layer (SSL) developed originally by Netscape (trademark) has become widely accepted in the World Wide Web for encrypted and authenticated data communications between a client and server. The Internet Engineering Task Force (IETF) standard Transport Layer Security (TLS) is based upon SSL.

The SSL/TLS protocol runs above the TCP/IP layer in the protocol stack, but below higher level application protocols such as HTTP (Hypertext Transport Protocol), IMAP (Internet Messaging Access Protocol) and so on. The SSL/TLS protocol establishes a secure connection between a client and a server, allowing optionally the client to authenticate itself to the server and the server to authenticate itself to the client and to establish a secured connection.

Like other security protocols, the SSL/TLS protocol includes a secured key exchange process. This is known as a handshake in SSL/TLS. During a handshake, a client sends a pre-master secret encrypted by the server's public key. The server is required to perform the corresponding private key decryption to retrieve the pre-master secret. Private key decryption (e.g. RSA in SSL/TLS) is extremely CPU intensive. This operation has been measured to cost more than 70% of the CPU cycles required for an entire handshake.

This problem has spurred the introduction of many SSL/TLS accelerators in the market. A proxy approach is taken where an intermediate box/switch (between a client and a server) will act as an accelerator and a virtual server. This virtual server terminates SSL/TLS and sends the corresponding data in clear to the destined server—the real server.

As data security becomes a priority, clear data in the intranet is not acceptable to industries such as the government and the financial sectors. As such, accelerator vendors address the data security requirement by securing the data connection between an accelerator and a server.

Effectively, this doubles the resource requirements at an accelerator—for each client connection, an accelerator has to decrypt and re-encrypt all payload. In addition, there are two handshakes for the connection—one between the client and the virtual server and another between the virtual server and the real server. Although some accelerators reuse the connection between the virtual server and the real server as a performance enhancement, decryption and re-encryption of the payload is still required at the virtual server.

SUMMARY OF THE INVENTION

An objective of the present invention is to provide end-to-end security with selective offload.

The present invention advantageously offloads servers for CPU intensive cryptographic call set up functions; addresses security concerns by providing end-to-end security; and load balances secured communications. Embodiments of the present invention take advantage of client ubiquity available with secure sockets layer (SSL).

Embodiments of the present invention provide for personal, policy based security level, that is, either end-to-end, end-to-virtual server or virtual server to real server. The decision on the type of security can be dynamic with the policy based on the application in question or on the client's identity from his/her certificate or cookie or any other combination.

Further flexibility proves the ability for customers to evolve their own security policy model at any time (either on a per client basis and/or on a per application basis). Consequently, embodiments of the present invention can handle either the SSL/TLS handshake only or both the SSL/TLS handshake and the SSL/TLS payload processing portions of the secure communication.

Various selective load balance schemes are possible, for example, certificate, cookie and other schemes.

BRIEF DESCRIPTION OF THE DRAWINGS

The present invention will be further understood from the following detailed description with reference to the drawings in which.

DETAILED DESCRIPTION OF THE PREFERRED EMBODIMENT

Figure 1:
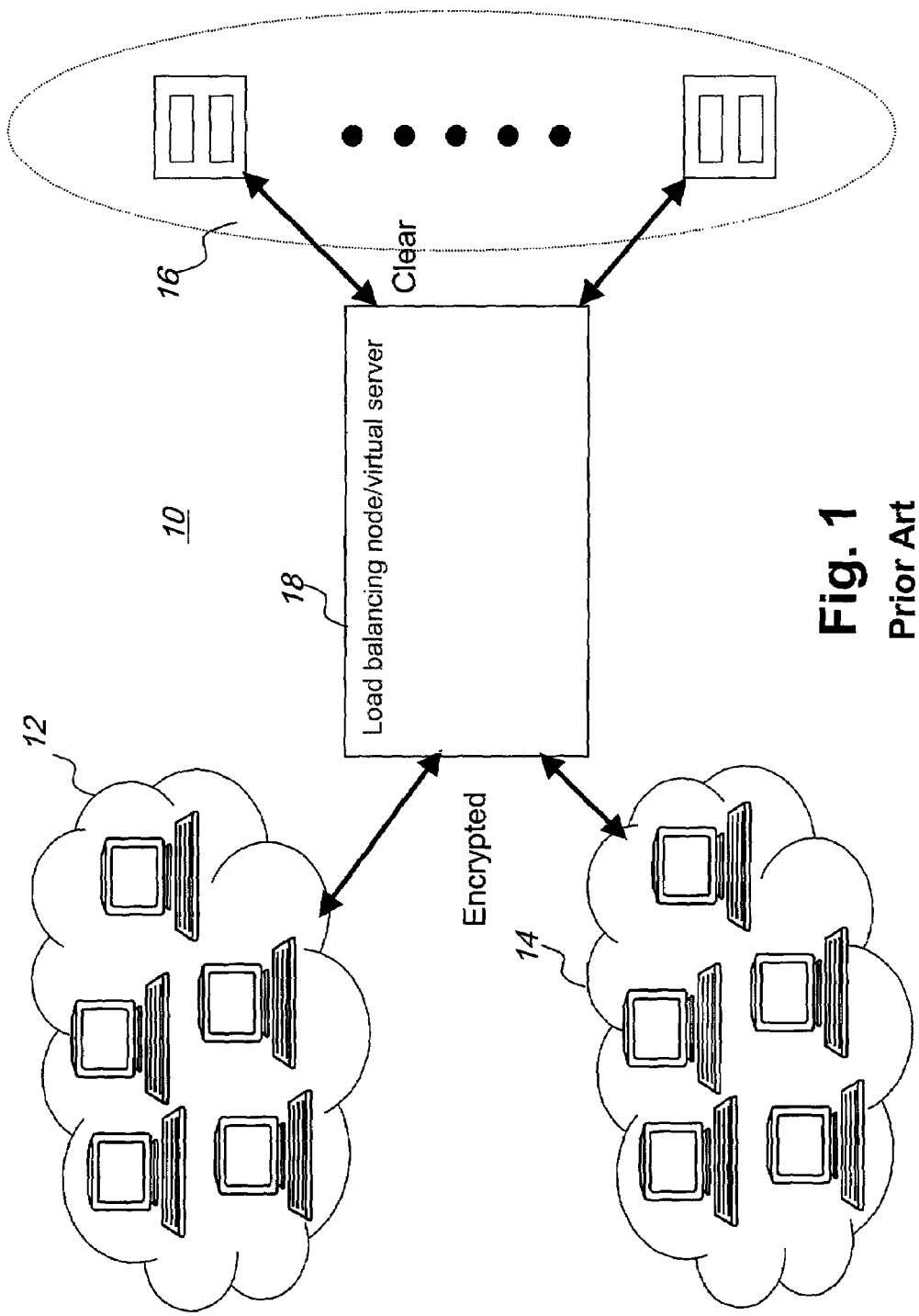
FIG. 1 illustrates in a block diagram a known load balancing arrangement in a client-server network.

Referring to FIG. 1, there is illustrated in a block diagram a known load balancing arrangement in a client-server network. The client-server network 10 includes client networks 12 and 14, a server cluster 16 and a load balancing node 18.

In operation, the load balancing node 18 terminates the encrypted links from the client network 12 and 14 and connects to the server cluster 16 without encryption. In this way, the load balancing node serves two purposes it offloads SSL (both handshake and payload processing from the servers and it ensures load balancing of the servers in the server cluster 16. As long as the encryption need not be end-to-end, this arrangement works reasonably well. However, if it is a requirement to provide end-to-end encryption, that is, an encrypted path from the client to the server and back again, the load balancing node 18 is faced with the burden of acting as a client for server cluster 16, and a server for the client clusters 12 and 14. Consequently, the computational load on the load balancing node 18 is double what it would be in the arrangement of FIG. 1. For example the load balancing node 18 can be a Nortel Passport 8600 switch with Web Switch Module, Alteon Integrated Service Director—SSL accelerator.

Figure 2:
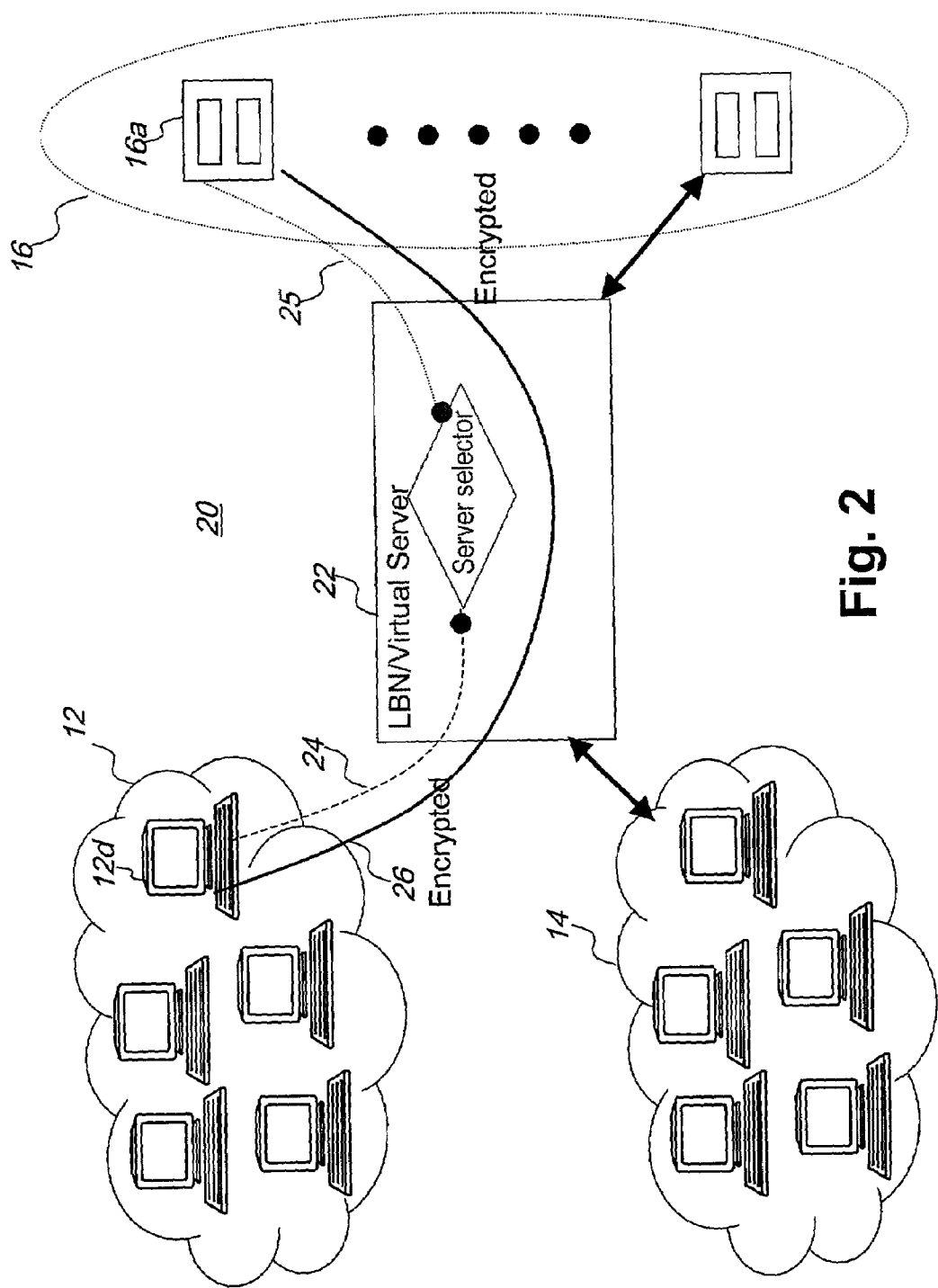
FIG. 2 illustrates in a block diagram a client-server load balancing arrangement in accordance with an embodiment of the present invention.

Referring to FIG. 2, there is illustrated a client-server load balancing network in accordance with an embodiment of the present invention. The client-server network 20 includes client networks 12 and 14, a server cluster 16 and a load balancing node 22.

The load balancing node 22 in accordance with an embodiment of the present invention provides an accelerated SSL call set up process.

In operation, the load balancing node 22 handles the CPU intensive SSL handshake portion 24 of the SSL connection protocol, generates the working keys and securely exports the working keys, the TCP/IP information of the client and the SSL session information over connection 25 to the selected server 16a. The secure connection 26 from client 12d is then transferred to the server 16a once the handshaking portion is completed. Details of the operation of the network of FIG. 2 are provided herein below with regard to FIG. 3.

Figure 3:
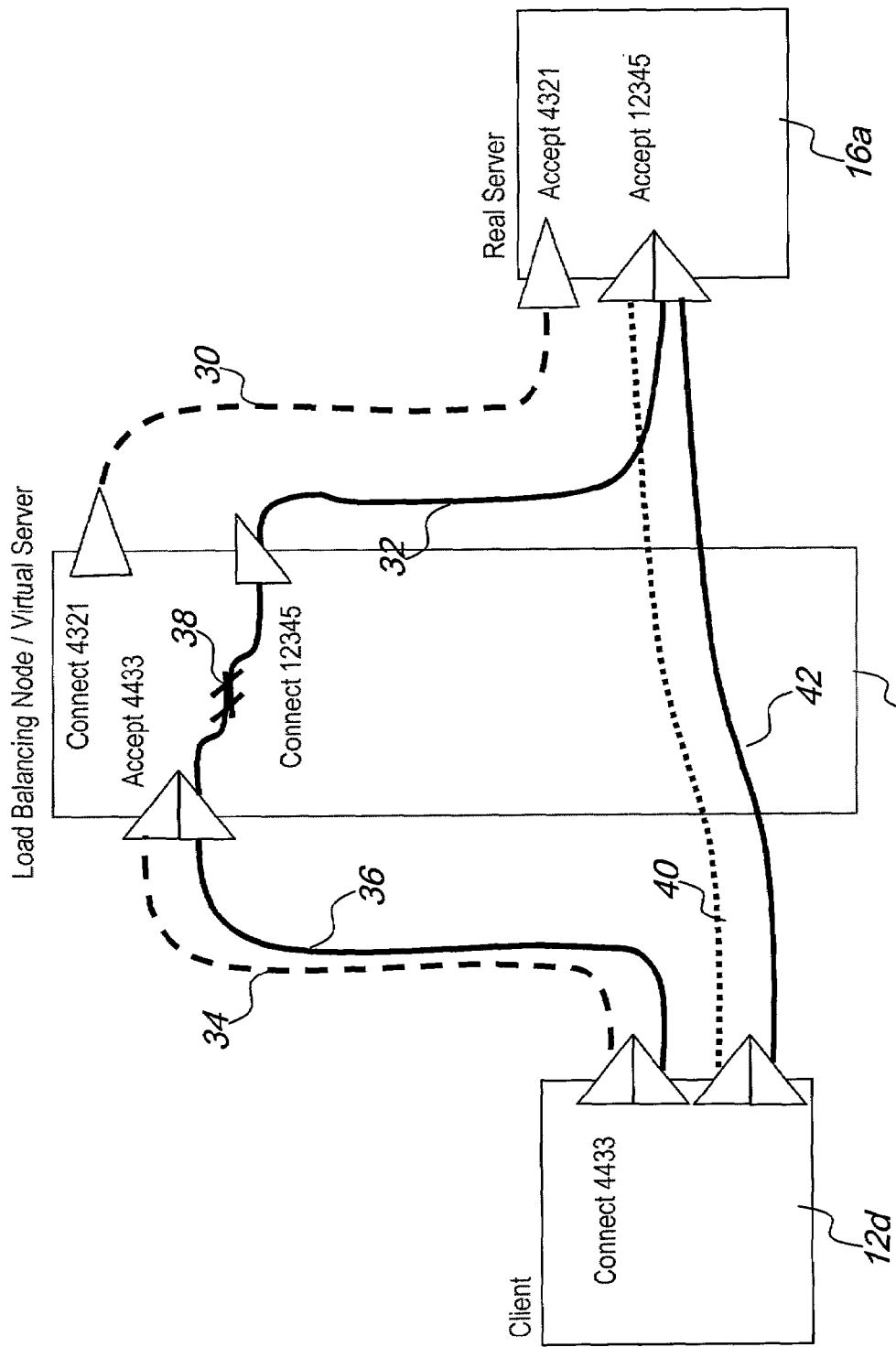
FIG. 3 illustrates in a block diagram a demonstration set up for the arrangement of FIG. 2.

Referring to FIG. 3 there is illustrated in a functional block diagram a demonstration set up for the embodiment of FIG. 2.

The demonstration setup of FIG. 3 is used to explain in greater detail, operation of the load balancing node 22 of FIG. 2. For consistency with FIG. 2, the same reference characters are used in FIG. 3 for the client 12d, the load balancing node (LBN) 22 and the server 16a.

For the demonstration, port numbers are pre-assigned, however, it should be understood that in an implementation in an actual network, port assignments would be configurable.

The following describes, in detail, a demonstration of the operating principles of the embodiments of FIG. 2, with reference to FIG. 3.

1. The load balancing node LBN acts as a virtual server.
   1.1 It listens to an SSL port. This is selected to be 4433 in the example for incoming client SSL connections.
   1.2 When a client SSL connection is received by a virtual server (LBN 22), a Full Handshake is done between the virtual server (LBN 22) and the client 16d. Once a full handshake is done (server's Finished message is composed and is ready for transmission), LBN 22 selects a real server based on its load balancing policy which can be policy based, cookie-based, certificate-based, usage-based, or any combinations of the above or more.
   1.3 If the load balancing scheme does not require payload inspection, LBN22 securely exports the session context, the keying material and the client's TCP/IP context to the 'selected' real server 16a over its control channel (VRC) 30. This is the VIP-RIP control channel (VRC) 30. This is a secured connection for keying materials, TCP/IP information, SSL session information, etc. to enable a real server to continue a client SSL connection where the LBN has left in an SSL connection.
   1.4 If the load balancing scheme requires payload inspection then LBN 22 needs to buffer the client encrypted data and the corresponding working keys for later transmission to the to-be-selected real server. The corresponding clear (decrypted) data is then inspected to select a real server. As in 1.3, the control information is then sent to the selected real server. The client encrypted data will be sent later in 1.5 when the data connection to the selected real server is established.
   1.5 LBN 22 connects to the ssl port (12345 in the example) of the selected real server 16a (connection 32). When data connection 32 is established between LBN 22 and the selected real server 16a, the two connections 36 and 32 will be spliced at TCP layer and relay of client ssl traffic to the real server 16a will begin.
   1.6 If a client (12d) initiates another SSL connection to the virtual server (LBN 22), the virtual server (LBN 22) will splice this connection (40 for session reuse handshake & 42 for payload) directly to the real server (16a) selected for the first connection from the same client (12d). This provides persistence (which is a customer configurable feature) where connections from the same client are served by the same real server (within a window as defined by customer policy).
2. The real server 16a listens to an ssl port (12345 in the example) and a pre-configured port for control data (port 4321 in the example).
   1.1. On receiving control data from a virtual server, a real server sets up the context for the forthcoming client ssl connection. The client's TCP/IP information, the ssl session context (for session reuse) and the working keys for the forthcoming ssl connection are set up at the real server 16a.
   1.2. When a new ssl flow is "accepted" at the ssl port (12345 in the example), the server 16a checks if there is a context (TCP/IP, ssl session & working keys) for the new ssl flow.
   1.3. If the context is already set up, the real server 16a uses that context to continue an ssl connection. In other words, it picks up where the virtual server has left.
   1.4. If not, the real server checks if the ssl session is in cache. If so, an ssl session reuse will be done. This reuse handshake (which is substantially less CPU intensive) is indicated by line 40.
   1.5. By setting up an ssl session context at a real server, subsequent client ssl connections (session reuse) can be spliced by LBN 22 to the previously selected real server (line 40 for session reuse handshake & line 42 for payload). LBN 22 is not involved in any handshake nor ssl processing for lines 40 and 42.
   1.6. If the context is not set up and the ssl session is not in cache, then the real server 16a will perform a full handshake as per customer's policy.

What is claimed is:

1. A method for managing a data transmission in a network, the network having a client, a load balancing node and a server cluster, the method comprising the steps of:
   monitoring a port on the load balancing node, the port using a security protocol;
   receiving a client connection, the connection being based on the security protocol, and having TCP/IP information of the client;
   establishing handshake between the client and the load balancing node based on the security protocol, the handshake resulting in session information and working keys;
   selecting a real server from the server cluster by the load balancing node based on a load balancing policy;
   exporting a context to the real server, the context comprising the TCP/IP information of the client, the session information, and the working keys;
   extending a logical end point of the client connection from the load balancing node to the real server to form a real server connection;
   splicing the client connection and the real server connection to relay a traffic, the traffic being encrypted using the security protocol, between the client and the real server; and
   establishing a direct communication between the client end the real server for subsequent connections having the context.

2. The method of claim 1 wherein the load balancing node is a virtual server.

3. The method of claim 1 wherein the security protocol is Secure Socket Layer (SSL).

4. The method of claim 1, further comprising the step of checking a session in a cache, the session based on the security protocol, and reusing the handshake in the presence of the session in the cache.

5. The method of claim 1 wherein the establishing step includes a step of parsing a certificate of the client to select the server among a server cluster.

6. The method of claim 5 wherein the establishing step further includes a step of connecting to the server based on the certificate.

7. The method of claim 1 wherein the establishing step includes a step of decrypting information from the client to select the server.

8. The method of claim 7 wherein the establishing step further includes a step of connecting to the server based on the decrypted information.

9. A load balancing node for managing a data transmission in a network, the network having a client and a cluster of servers, the load balancing node comprising:
- a monitor for monitoring a port on the load balancing node, the port using a security protocol;
- a receiver for receiving a client connection, the client connection being encrypted using the security protocol, and having TCP/IP information of the client;
- a handshake executor for establishing a handshake between the client and the load balancing node based on the security protocol, the handshake resulting in session information and working keys;
- a selector for selecting a real server from the server cluster based on a load balancing policy;
- a sender for exporting a context to the real server, the context comprising the TCP/IP information of the client, the session information and the working keys;
- an elongator for extending a logical end point of the client connection to the real server to form a real server connection;
- a splicer for splicing the connection and the real server connection to relay a traffic, the traffic being encrypted using the security protocol, between the client and the real server; and
- a communicator for establishing a direct communication between the client and the real server for subsequent connections having the context.

10. The load balancing node of claim 9 wherein the load balancing node is a virtual server.

11. The load balancing node of claim 9 wherein the security protocol is Secure Socket Layer (SSL).

12. The load balancing node of claim 9, further comprising a matcher for checking a session in a cache, the session based on the security protocol, and a recycler for reusing the handshake in the presence of the session in the cache.

13. The load balancing node of claim 9, further comprising means for parsing a certificate of the client to select the real server among the server cluster.

14. The load balancing node of claim 13 further comprising means for connecting to the real server based on the certificate.

15. The load balancing node of claim 9 further comprising means for decrypting information from the client to select the real server.

16. The load balancing node of claim 15 further comprising means for connecting to the real server based on the decrypted information.

* * * * *